US009744729B2

(12) United States Patent
Lee (10) Patent No.: US 9,744,729 B2
(45) Date of Patent: Aug. 29, 2017

(54) METHOD AND APPARATUS FOR AUTOMATED FABRICATION

(71) Applicant: Rusty Shawn Lee, Los Angeles, CA (US)

(72) Inventor: Rusty Shawn Lee, Los Angeles, CA (US)

( * ) Notice: Subject to any disclaimer, the term of this patent is extended or adjusted under 35 U.S.C. 154(b) by 0 days.

(21) Appl. No.: 14/543,259

(22) Filed: Nov. 17, 2014

(65) Prior Publication Data

US 2015/0069665 A1     Mar. 12, 2015

Related U.S. Application Data

(62) Division of application No. 12/511,073, filed on Jul. 29, 2009, now Pat. No. 8,934,994.

(60) Provisional application No. 61/084,990, filed on Jul. 30, 2008.

(51) Int. Cl.
| G05B 13/02 | (2006.01) |
| G05B 15/00 | (2006.01) |
| B29C 67/00 | (2017.01) |
| G05B 19/4099 | (2006.01) |
| B33Y 30/00 | (2015.01) |
| B33Y 50/02 | (2015.01) |

(52) U.S. Cl.
CPC ...... *B29C 67/0088* (2013.01); *B29C 67/0055* (2013.01); *G05B 19/4099* (2013.01); *B33Y 30/00* (2014.12); *B33Y 50/02* (2014.12); *G05B 2219/49016* (2013.01)

(58) Field of Classification Search
CPC .... B33Y 30/00; B33Y 50/02; G05B 19/4099; G05B 2219/49016; G06F 9/4843; G06F 8/34
USPC ........ 700/1, 47, 90, 268; 703/6; 706/10, 12, 706/14, 15, 19, 20, 21, 23, 26, 45, 62; 438/14, 22, 48, 381, FOR. 426; 422/50, 422/62; 134/198; 264/308
See application file for complete search history.

(56) References Cited

U.S. PATENT DOCUMENTS

| 4,668,476 | A | 5/1987 | Bridgham et al. |
| 5,473,706 | A | 12/1995 | Bacus et al. |
| 5,779,967 | A | 7/1998 | Hull |
| 6,120,733 | A | 9/2000 | Goodman et al. |
| 6,624,388 | B1 * | 9/2003 | Blankenship ........ B23K 9/1062 219/130.5 |
| 6,999,607 | B2 | 2/2006 | Kiros et al. |
| 7,037,382 | B2 | 5/2006 | Davidson et al. |
| 7,470,541 | B2 | 12/2008 | Copeland et al. |
| 2002/0113331 | A1 * | 8/2002 | Zhang .................. B29C 41/003 264/40.1 |
| 2006/0156978 | A1 * | 7/2006 | Lipson ................ B29C 67/0055 118/708 |

* cited by examiner

*Primary Examiner* — Dean Kwak
(74) *Attorney, Agent, or Firm* — Valauskas Corder LLC (57) ABSTRACT

A method and apparatus are presented for automatically fabricating arbitrary materials and objects from raw components, using a combination of simple chemical, electrical, and mechanical operations. The invention will automatically generate machine control instructions for controlling automated fabrication devices and equipment from simple instructions in natural language. The invention also allows the sharing, remote execution, scheduling, and automatic ingredient ordering for such instructions to allow the creation of new materials and professional object fabrication with little or no human intervention.

10 Claims, 6 Drawing Sheets

Scheduled recipes:

| 6:00pm | 8/21/02 | Plastic water bottle [3] |
| 7:00am | 8/22/02 | Caffeine tablet |
| 5:00pm | 8/22/02 | Shoe insole, foam [2] |

Select a recipe:

| Cookware | Antifungals | Ibuprofen |
| Electronics | Sedatives | Acetaminophen |
| Jewelry | Painkillers > | Aspirin |
| Medicine> | Antibiotics | Naproxen |
| Fuel | Antiseptics | | carbon nanotube

Find Recipe

1:00 PM 8 21 02

User Preferences

Schedule Recipe

Display Ingredients

Execute Recipe

Print Shopping List

Purchase Recipe

Order Materials

Add/Share New Recipe

Quit

METHOD AND APPARATUS FOR AUTOMATED FABRICATION

CROSS-REFERENCE TO RELATED APPLICATIONS

This application is a divisional application of U.S. patent application Ser. No. 12/511,073, filed Jul. 29, 2009, which claims priority to U.S. Provisional Patent Application Ser. No. 61/084,990, filed Jul. 30, 2008.

BACKGROUND OF THE INVENTION

The present invention is related to robotic control systems, and more particularly to automated fabrication systems. It is also best viewed in light of the art of chemistry, computer software, natural language processing, and CNC manufacturing.

Stereo lithography and other 3-D printing techniques are becoming increasingly popular. Material science is in its infancy. If chemistry experimentation were more accessible to a wider audience, many more new compounds could be developed, from green, environmentally-friendly chemical processes for plastics that do not require fossil fuels as inputs, to custom nano-coatings that reduce heat transfer on windows or consumer electronics. While there are a number of automatic assays (U.S. Pat. No. 5,473,706 and U.S. Pat. No. 6,120,733) and laboratory experiment automation devices (U.S. Pat. No. 6,999,607 and U.S. Pat. No. 7,470,541), particularly in biology, no general purpose method or apparatus in the prior art is flexible, portable, and cheap enough to produce new custom parts for aircraft or life-saving medicine in the average consumer's home, or in an RV, or military vehicle, in a fully automated fashion. Furthermore, such systems typically require specific instructions designed for that particular system or family of systems to generate a particular type of compound, with a very limited set of operations supported (U.S. Pat. No. 4,668,476). One cannot simply take a device used to make aspirin, and use it to make bullet-proof plastic instead, or even most other common drugs, without human intervention.

Likewise, 3-D printing technology and stereolithography techniques (U.S. Pat. No. 7,037,382 and U.S. Pat. No. 5,779,967) only operate with a very limited range of materials, typically custom plastics, woods, or metals with specifically designed bonding properties, that must be the only combination of materials used by the 3-D printing device. There is also no opportunity to further react or modify these materials in the process of 3-D printing, after they have been bonded to the rest of the output object. What is needed is a way to manipulate the materials in a 3-D printing process even after they have been bound to the object being created, to allow for a greater range of materials, the application of coatings, wiring, transistor structures, and other enhancements necessary to create electronics, custom optics, new chemical compounds, and other objects that today's 3-D printing technology and automated chemical process equipment cannot make.

BRIEF SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In accordance with one embodiment of the present invention is an automated fabrication device, the Nanofabricator (NF), that applies various chemical, mechanical, and electrical operations on materials placed inside it, to produce new or compound materials and three-dimensional objects in a fully automated fashion. For example, the device can be used by military troops in the field to produce pharmaceuticals on demand, or non-stick cookware, or repair parts for fighter jets, or by amateur or professional chemists to research new advanced materials and greener chemical processes, or even to repair damaged raincoats by applying a new water-repellant coating.

The preferred embodiment further comprises a software system for controlling and manipulating materials into new materials and processed products using various automated devices via computer control. The computer system can use an ordinary instruction file, written in natural language, such as that which one finds in a chemical engineering or lab experiment book, and will generate one or more machine-readable instruction files suitable for use with an automated fabrication device such as the Nanofabricator, or a collection of automated fabrication equipment. The present invention can transmit or download these instructions to the automated fabrication equipment and interact with such equipment to ensure proper execution. This allows the present invention to use the vast number of publicly and commercially available descriptions of various established and experimental chemical processes, along with 3-D CAD files of objects, to automatically fabricate the materials and objects specified in these files and descriptions with little or no human intervention, as well as easily create new objects, descriptions, and chemical processes.

The present invention also allows the user to control the scheduling and execution of material and object fabrication both locally and remotely, and can automatically predict and order needed ingredients for both scheduled fabrications and those not yet scheduled based on prior history of usage.

BRIEF DESCRIPTION OF THE SEVERAL VIEWS OF THE DRAWING

The novel features believed characteristic of the invention are set forth in the appended claims. The invention itself, however, as well as other features and advantages thereof, will be best understood by reference to a detailed description of a specific embodiment which follows, when read in conjunction with the accompanying drawings, wherein:

DETAILED DESCRIPTION OF THE INVENTION

In the preferred embodiment, the Nanofabricator (NF) is an automated fabrication device that includes an enclosure, multiple carriage tracks, a collection of containers, compartments for applying various operations to containers or their contents, input and output facilities, and control mechanisms. The preferred embodiment further comprises a software system for controlling and manipulating materials into new materials and processed products using various automated devices via computer control.

An alternative embodiment uses a miniaturized version of the described NF made by scaling down the sizes of all the components, and only using one robotic arm and carriage track, and only one 3-D plotting device and carriage track.

Figure 1:
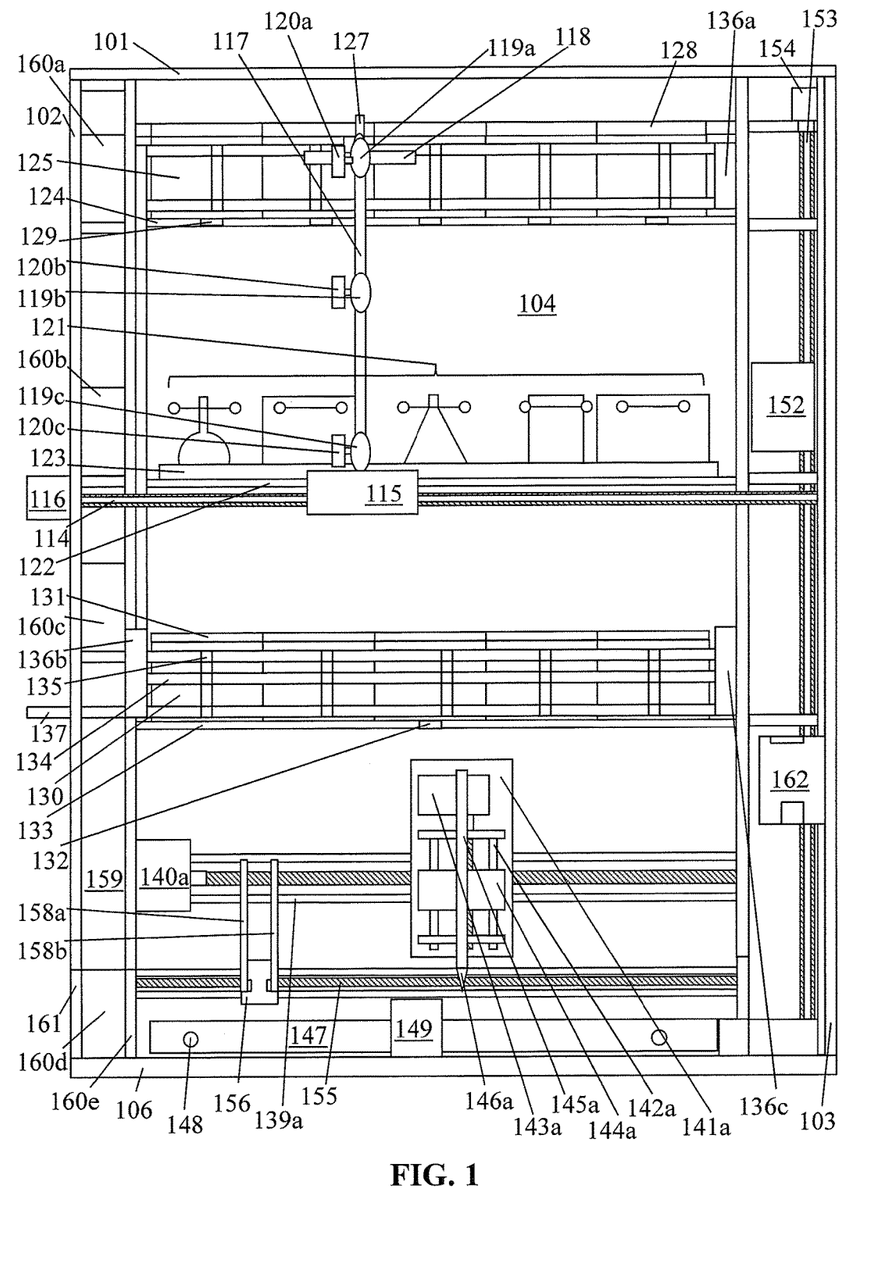
FIG. 1 shows the Nanofabricator device in the preferred embodiment from the rear view, with the rear panel removed.
Figure 2:
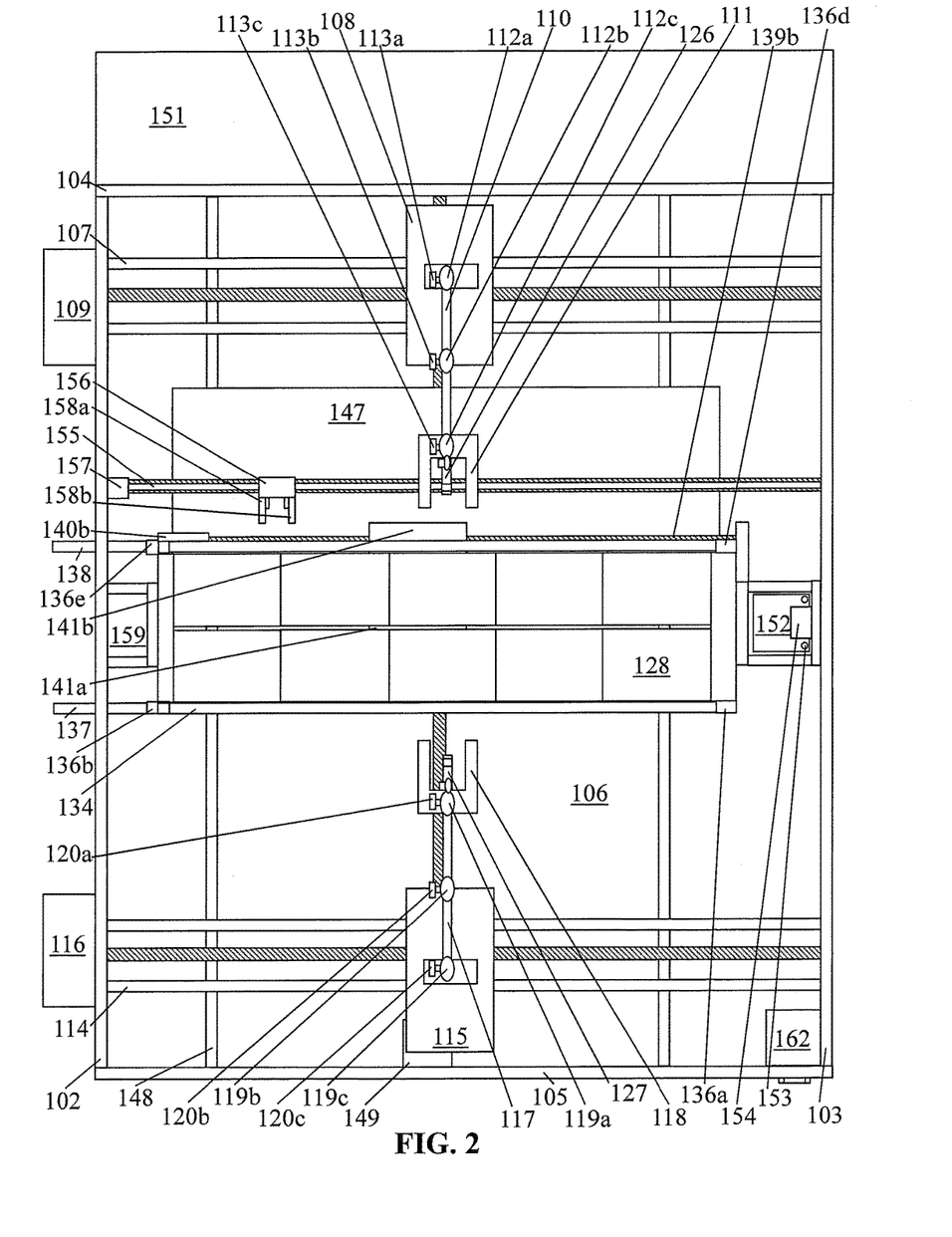
FIG. 2 shows the Nanofabricator device in the preferred embodiment from the top view, with the top panel removed.
Figure 3:
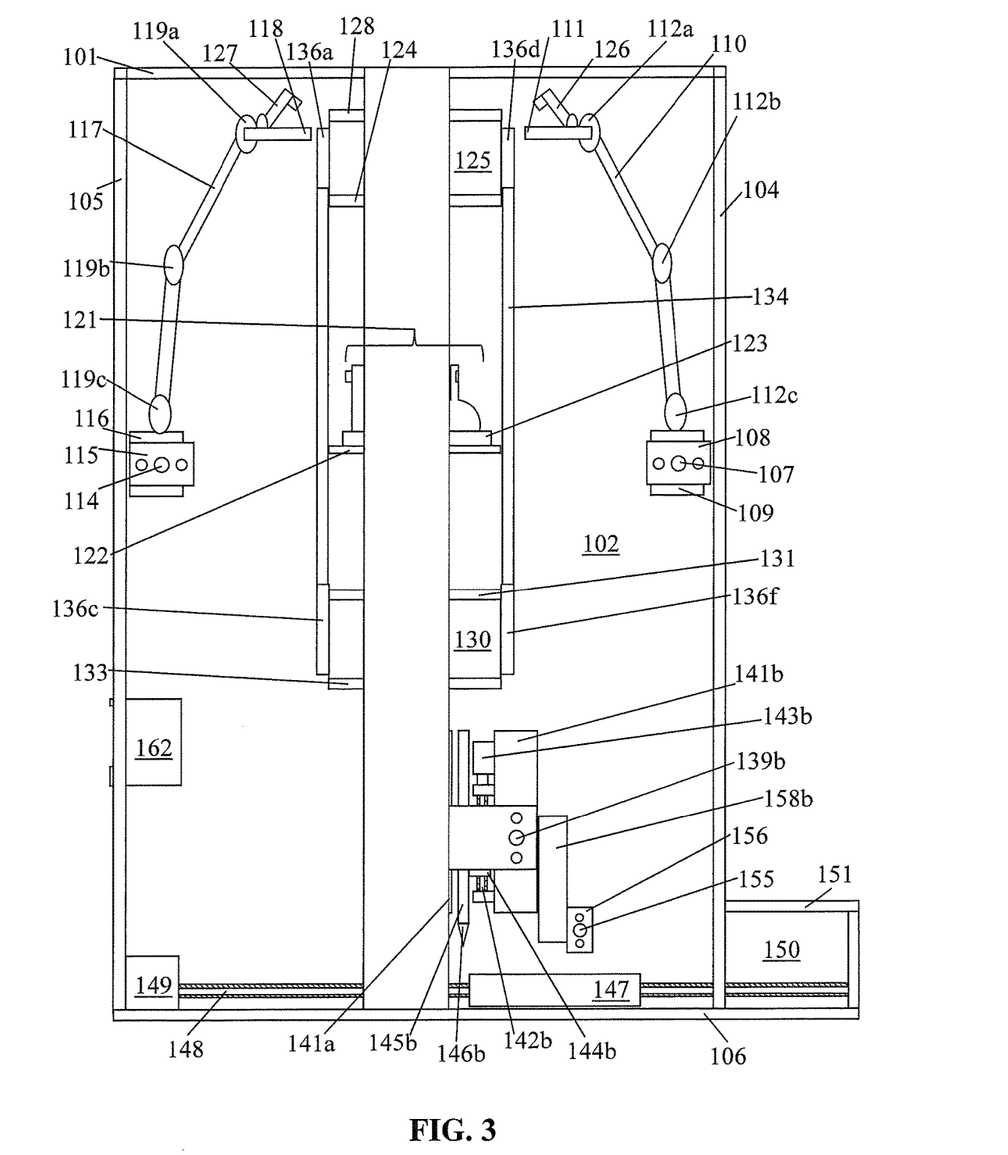
FIG. 3 shows the Nanofabricator device in the preferred embodiment from the left side view, with the left side panel removed.

The enclosure consists of six panels of medium-density fiberboard 101-106 arranged in a cube, bolted together as shown in FIG. 1, FIG. 2, and FIG. 3. FIG. 1 shows the rear panel 105 removed, FIG. 2 shows the top panel 101 removed, and FIG. 3 shows the left side panel 103 removed. The front panel 104, right side panel 102, and bottom panel 106 are bolted to the top panel 101 the left side panel 103 and the rear panel 105 to form a cube.

Two carriage tracks, one on the front side 107 and one on the rear side 114 of the device are used to support and move a robotic arm on each side of the device. Each carriage track comprises a central lead screw and two support rods surrounding the lead screw. Each lead screw is driven by a stepper motor 109, 116 to move the carriage 108, 115. In an alternative embodiment, a servo mechanism replaces the stepper system.

Each robotic arm includes two rigid shaft segments 110, 117 and a two-pronged gripper 111, 118 connected to each other and the carriage 108, 115 through three pivoting screws 112a-c, 119a-c. Each pivoting screw is driven by an independent motor 113a-c, 120a-c coupled to it. This allows each robotic arm to rotate to a wide range of angle combinations, allowing it to pick up and manipulate various containers 121. Each robotic arm also has an independently controllable sealing mechanism 126, 127 attached to the two-pronged gripper with another pivoting screw, which also has its own independent motor to rotate the seal into place on a container 121.

A range of containers 121 of various shapes and sizes and materials rests on a shelf 122 in the center of the NF. A removable tray 123 attached to the shelf 122 contains spaces for each of the containers 121 to sit its base in. Fused silica, polyethylene, metal, and ceramic containers are available to facilitate a wide range of temperature, pressure, pH, and chemical reactivity conditions. The default selection of containers included in the preferred embodiment comprises one fused silica conical flask, two round-bottom flasks, and two beakers, one polyethylene conical flask and two beakers, one silicon carbide breaker, and one ceramic beaker. However, the containers can be swapped out for others by the user to accommodate any desired material and chemical requirements.

Each container 121 is equipped with a pair of gripping handles with holes to fit the two-pronged grippers 111, 118. This allows the robotic arms to lift the containers and move them as desired, without spilling their contents, while the sealing mechanisms 126, 127 can simultaneously be inserting or removing a seal.

In an alternative embodiment, each container is also equipped with an automatic seal at the top, which can be opened and closed by an electrical signal sent from the conductive two-pronged grippers 111, 118 while they are holding a container. In another alternative embodiment, a pressure or vibrational signal is used instead of an electrical signal, using a purely mechanical mechanism to open and close the seal that does not require conduction or electricity. In yet another alternative embodiment, the seals are manually put in place using one or more robotic arms, allowing the use of a wide variety of seals of different materials themselves equipped with gripping handles, which can be dynamically matched with different containers. One robotic arm can also be holding a container while another robotic arm removes or inserts a seal.

The top shelf 124 of the NF includes ten storage bins 125 in the center of the device, in two rows of five bins. Each storage bin is equipped with a lid 128 on the top, which can be removed to allow loading of the bins. The top panel 101 can also be easily removed to allow access to the storage bins 125. Removing any of the lids 128 or the top enclosure panel 101 does not impact the functionality of the device, which will continue to run even while the top panel 101 is removed or bins 125 are being loaded. In the case where gas is being loaded in through the top of the bin, the gas feed can be secured to the bin in a manner that seals off the top of the bin to prevent gases from escaping, such as by using a lid with a gas valve or manually blocking any exposed areas.

The top shelf 124 includes an independent port 129 underneath each and every storage bin 125, which can be opened to allow contents to enter into the containers 121. In the preferred embodiment, the ports 129 are electronically controlled by a simple actuator that can automatically open and close them as desired. The robotic arm will pick up a container 121 and position it directly underneath a port 129 of a storage bin 125, then a signal will be sent to automatically open that port, allowing the contents of the storage bin to enter the container. A weight sensor and optical sensor on the robotic arm's gripper 111, 118 allow it to detect when sufficient material has entered the container and automatically close the port 129. Additionally, each storage bin 125 is equipped with sensors to measure the mass and volume of its contents, which can also be used to detect when sufficient material has exited the storage bin, and therefore entered the container. In the preferred embodiment, the port is automatically closed when either the bin's sensors or the gripper's sensors have detected sufficient material moving into the container. In an alternative embodiment, only the bin sensors are used. In another alternative embodiment, only the gripper sensors are used.

Once a container 121 is filled with material from a storage bin 125 and the relevant storage bin's port 129 is closed, the robotic arm moves away the container and uses its sealing mechanism 126, 127 to ensure that the contents do not escape. The robotic arm places a container into a reaction chamber 130 that is capable of executing the desired chemical, mechanical, or electrical reaction with the material in the container being placed. If needed, the robotic arm will instead hold the container upside down and release the sealing mechanism 126, 127 over the open reaction chamber 130 in order to insert its contents into the reaction chamber, but not the container itself. This is desirable, for example, when two materials need to be combined, or moved from one container to another.

Each reaction chamber 130 is designed to apply a combination of one or more operations on its contents, such as heat, cold, a series of temperature gradients, pressures, ultrasound, electricity, EMF waves, radiation, light, spinning, mixing, filtering, or other operations. These simple operations can be combined to carry out an extremely wide range of reactions. Each reaction chamber 130 is equipped with its own lid 131, which can be electronically opened and closed by a simple actuator, allowing it to automatically open when the robotic arm is inserting something into it or removing something from it, and to close afterwards. Some of the reaction chambers (the middle two, in the preferred embodiment) are also each equipped with ports 132 on the bottom that are also electronically opened and closed by a simple actuator, similarly to the ports 129 of the reaction bins 125. These ports 132 are used to feed the output of the reactions into the 3-D plotting devices below.

Figure 6:
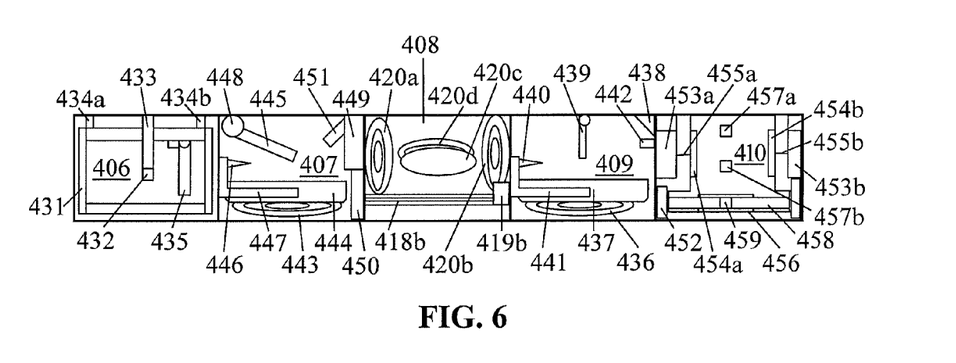
FIG. 6 shows the interior of the front reaction chambers of the Nanofabricator device in the preferred embodiment.
Figure 7:
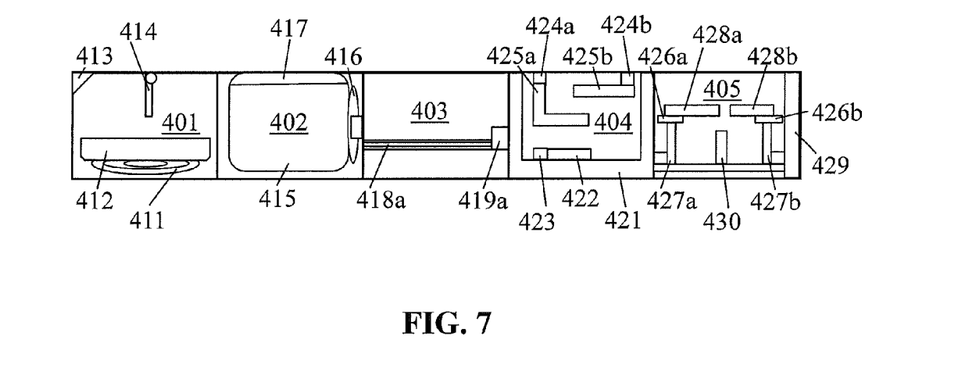
FIG. 7 shows the interior of the rear reaction chambers of the Nanofabricator device in the preferred embodiment.

In the preferred embodiment, there are ten reaction chambers 130 secured on a shelf 133 in the center of the NF. Each reaction chamber has three independent electronically controlled intake/outtake valves that connect it to the piping system 134 through a box junction 135, allowing a set of pumps 136b, 136c, 136e, 136f to increase or decrease the pressure in a reaction chamber, pump gases, fluids, or solids in or out, and create vacuum conditions. Each reaction chamber also includes a standard array of pressure, temperature, weight, and volume sensors as well as a video camera, built into the walls of the chamber, as well as optical and flow volume sensors at each intake/outtake valve. Individual reaction chambers also contain further sensors to guide and measure the effects of their operations, as appropriate. The insides of the front five reaction chambers 406-410 included in the default configuration of the preferred embodiment are illustrated in FIG. 6 and the insides of the rear five reaction chambers 401-405 included in the default configuration of the preferred embodiment are illustrated in FIG. 7.

The first rear reaction chamber 401 includes a heating element 411, a heat-resistant rapid spinner 412, a directed ultrasonic transducer 413, and a stirring device 414 that is built into the lid. The spinner 412 utilizes a heat-resistant electric motor to spin a fixed platform about a vertical axis. Any containers or raw materials placed on the spinner platform will likewise spin, and the outer edge of the platform is sloped to keep its contents secure. The spinner platform also has an electronically controlled channel at the outer edge that can be opened or closed to allow drainage, if desired. The stirring device 414 can be rotated at variable speeds along a ball joint by electric motors, allowing it to conduct a wide array of mixing operations, and to be raised and lowered into a container. Each of these elements can be electronically controlled to a high degree of precision, for example, to apply a specific temperature of heat by regulating the amount of electricity directed through the heating element 411, or the speed of the spinner 412, or to control the waveforms produced by the ultrasonic transducer 413. In combination with the intake/outtake valves and piping system 134, this allows the reaction chamber to perform chemical operations that range from operations such as spin coating, to mixing a solution while slow heating in a high pressure environment, to others, such as ultrasonic cleaning of dirty containers or of the reaction chamber or piping system itself. Very thorough cleaning can be achieved by ultrasonically exciting a cleaning fluid that has been pumped through the desired element to clean, then rinsing with high pressure distilled water. This cleaning process is used in the preferred embodiment to clean the containers, reaction chambers, storage bins, piping system, and other parts of the NF itself, which is done automatically in between uses of different chemicals and compounds that could affect each other.

The front reaction chamber 409 is similar to the first rear reaction chamber 401, with a heating element 436, a heat-resistant rapid spinner 437, a directed ultrasonic transducer 438, and a stirring device 439 built into the lid, except it also includes a pressure-controlled nozzle 440 that is capable of extruding any materials pumped in through a valved pipe 441 connected to the lower box junction of the piping system 134 along this reaction chamber, at an electronically controlled pressure and speed. Additionally, the ultrasonic transducer is mounted on the opposite side of the reaction chamber 409. An ultraviolet lamp 442 is also mounted below the ultrasonic transducer, which can be electronically controlled to emit ultraviolet radiation in variable patterns and intensities, by varying the current sent to the lamp. This also means that in addition to ultrasonic cleaning, this reaction chamber is capable of sterilizing its contents with heat or ultraviolet radiation. In an alternative embodiment, other forms of light or other radiation can be used instead.

The front reaction chamber 407 is similar to the aforementioned reaction chamber 409, with a heating element 443, a heat-resistant rapid spinner 444, a stirring device 445, and a pressure-controlled nozzle 446 connected to a valved pipe 447. However, the stirring device 445 is instead mounted on a corner ball socket 448 at an angle, allowing it a different range of motion for mixing and stirring. It also contains a magnetron 449, microwave transformer 450, and waveguide microwave emitter 451 in the place of the ultrasonic transducer and ultraviolet lamp, to allow microwaves to be directed at the contents of the chamber. The walls of the chamber, valves, exposed elements in the chamber, and the base of the spinner, are shielded to prevent microwaves from traveling outside of them or disrupting the electronics of the NF. In an alternative embodiment, other frequencies of RF energy are used instead. In addition to catalyzing chemical reactions, the microwave system can also be used for certain sterilization tasks, as well as smelting metal, and even electric arc welding and creating plasmas. In this case, the system will automatically vent any unwanted exhaust through the standard valves to the box junctions in the piping system 134 along the reaction chamber 407.

The second rear reaction chamber 402 includes a rotating chamber 415 with an electronically controlled lid 417 that can slide open and closed by means of a simple electric motor. The rotating chamber 415 is rotated about its horizontal axis by a variable-speed electric motor 416. In addition to spinning and mixing the contents of the chamber at variable speeds, this allows the reaction chamber 402 to invert a container 121 so that it can easily be picked up while fully upside-down by a robotic arm, without requiring the arm to rotate the two-pronged grippers 111, 118 upside-down, which allows the sealing mechanisms 126, 127 to be used to tap the bottom of a container rather than sealing it, to help expel the contents.

The middle rear reaction chamber 403 contains a layered grill 418a with holes of different sizes in each layer, where each layer can be independently extended or retracted electronically by a motor 419a. Rapidly fluctuating between extending and retracting a layer also results in shaking behavior, which can be desirable to sift materials through the holes. The preferred embodiment includes four layers, with holes of 30 millimeters diameter, 10 millimeters diameter, 1 millimeter diameter, and 0.1 millimeters diameter, respectively. By using different combinations of layers with different sized holes, particles of any supported size can be filtered. Any material filtered through the holes can either be pumped out into the piping system 134 through the valve at the bottom of the reaction chamber, or the port 132 at the bottom of the reaction chamber can be opened to drop the material into a 3-D plotter nozzle 145*a* or directly onto the output tray below. The middle front reaction chamber 408 is similar, with a layered grill 418*b* and motor 419*b* and its own output port that can drop material into its own 3-D plotter nozzle 145*b*, but it also contains an electronically controlled heating element 420*a-d* on each of the four side walls of the reaction chamber.

The next rear reaction chamber 404 is a high temperature gas furnace. The walls of the furnace on all sides are lined with a high temperature alumina-based concrete refractory 421. In an alternative embodiment, the refractory includes a layer of titanium diboride to resist extremely high temperatures of over 3000 degrees Celsius. A container inserted into the reaction chamber serves as a crucible, and the system selects a container appropriate for the expected heat. A high temperature thermocouple is used to ensure that the maximum allowed heat for the given container type is not exceeded, and to regulate that any desired reactions are kept at the appropriate temperature. Gas is pumped in from the piping system 134 through the lower valve connecting it to the lower box junction, into a pressure-regulated nozzle 422. The gas is ignited by the electric ignition element built into the pressure-regulated nozzle 422 that shoots out the gas at a controlled pressure and ignites it, much like a butane torch, pumping it in through an intake hole 423 into the furnace. The piping system can easily supply any available gas, for example, allowing propane fuel for mundane tasks, hydrogen fuel for high temperature, high-pressure tasks, and even mixtures of oxygen and other fuels like acetylene to allow for extremely high temperature, oxy-fuel operation. Exhaust holes 424*a-b* at the top of the refractory lead through heat resistant tubes 425*a-b* that allow the exhaust to cool down before going through the middle and upper box junctions into the piping system 134. These tubes 425*a-b* are equipped with pressure sensors and valves that can partially close or open to further regulate the pressure in the reaction chamber by decreasing the flow of exhaust out of the reaction chamber. The piping system can take further action to dissipate heat by pumping cold liquids through adjacent pipes before releasing the hot exhaust gases into them. The lid of the reaction chamber also contains a well-insulated refractory to seal the reaction chamber and prevent heat or exhaust from escaping, other than through the exhaust holes 424*a-b*.

The next rear reaction chamber 405 includes two electrode holders 426*a-b* on motorized rails 427*a-b* that can be moved back and forth electronically to position the electrodes as desired for an optimal reaction, using feedback from optical sensors. Each electrode holder supports a solid to be used as a reusable or consumable electrode 428*a-b*, which can be replaced by the user, or even inserted or removed by a robotic arm dumping or retrieving a properly positioned container. Each electrode 428*a-b* in a holder 426*a-b* is connected to the electrical system of the NF through the holders and rails 427*a-b*, allowing electricity to be applied through the electrodes, as well as allowing chemical reactions in the reaction chamber to generate electricity that is fed back into the NF through the electrodes. The precise positioning of the electrodes allows the reaction chamber to even carry on such precision operations as electric arc welding, and includes a block transformer 429 for this purpose, as well as a voltmeter and ammeter and potentiometer to measure and regulate the voltage and current. A pressure-regulated nozzle with an electric ignition element 430 shoots out gas to the center of the chamber at a controlled pressure and ignites it, allowing the electrodes to be positioned for combustion or heat-mediated reactions if desired. The gas flows into the nozzle from the piping system 134 through a valve on the lower box junction of the reaction chamber, and the nozzle 430 can seal itself off completely to prevent gases and liquids from entering in either direction. Gases and other materials can be pumped in and out through the valves connecting to the other two box junctions along the reaction chamber as normal, when those valves are open. The entire reaction chamber can also be filled with a liquid or gas as desired. This allows such activities as underwater electric arc welding for generating carbon nanotubes, or certain acids to be used for generating electricity. When performing electrolysis, the gases at the anode and cathode can be captured independently by positioning one electrode in front of the middle valve connected to the middle box junction along the reaction chamber, and extracting the gas at that electrode through that valve, while extracting the other gas through the valve at the top of the chamber, or into an inverted container over that electrode.

The front cooling reaction chamber 406 includes an inner chamber of six Peltier devices 431, one on each side, top, and bottom. By independently electrically controlling the voltages and currents across these Peltier devices, they can be used to generate cold, as well as heat, by reversing the polarity. The top Peltier device is connected to the lid of the reaction chamber by mounting brackets 434*a-b*, allowing it to be lifted out when the lid is opened, so that containers may be placed inside, and securely sealed when the lid is closed, creating an inner chamber for cooling. A heat and cold resistant pipe port 432 is connected through a valve to the middle box junction and piping system 134 along the reaction chamber, outside of the inner chamber of Peltier devices. This port 432 allows the heat and cold resistant pipe 433 to snap directly into the port when the lid of the reaction chamber is closed. This pipe 433 is connected to the lid at its top, and runs to the top of the reaction chamber outside of the Peltier devices, allowing any heat generated to be pumped out of the top of the reaction chamber through this pipe during cooling. The other box junctions attached to this reaction chamber open into the middle of the chamber normally, allowing it to extract and expel gases or other materials in the inner chamber during a reaction or as part of normal operation. Pumping in cold liquids or gases and pumping out the heat is another mechanism that reaction chambers can use to cool their contents. A stirring device 435 like the one 414 in the previous reaction chamber 401 is also mounted on the top Peltier device, allowing stirring of the inner chamber contents.

The front reaction chamber 410 contains a furnace, like reaction chamber 404, but is capable of handling more complex chemical processes such as thin-film chemical vapor deposition (CVD). The walls of the furnace on all sides, including the floor and the removable lid, are lined with a high temperature refractory 452 to direct heat and prevent heat and gases from escaping or interfering with the NF. The left and right sides of the reaction chamber also contain electromagnets 453*a-b* behind the refractory that can be precisely controlled to generate direct, pulsed, or alternating operation at fixed or varying currents and voltages and frequencies. The outer walls of the reaction chamber and lid above the refractory are also shielded to prevent strong electromagnets from interfering with the rest of the NF. Each electromagnet is connected to a temperature resistant conducting plate 454*a-b* through an insulated temperature resistant wire 455*a-b* embedded directly in the refractory so that it does not create any holes for gases to pass through. The substrate 456, container, or crucible for the reaction rests on the refractory floor, and gas or other materials are pumped in from the piping system 134 through the upper or middle valve connecting the reaction chamber to the upper or middle box junction, respectively, into a pressure-regulated nozzle 457*a-b*. The gas or other material can be ignited by the electric ignition elements built into the pressure-regulated nozzles 457*a-b* that shoot it out at a controlled pressure and ignite it, pumping it down into the central furnace chamber, and over the substrate 456. Suction outlets at either side of the bottom of the furnace chamber allow the gas or other material to be pumped out through heat resistant pipes 458 to an electronically controlled pressurized valve 459, which expels it out back into the piping system 134 through the lower box junction along the reaction chamber. The electromagnets allow this reaction chamber 410 to be used for electroplating and even high-density plasma deposition, in addition to standard thin-film CVD, allowing such exotic operations as carbon nanotube growth in an economically efficient manner.

Many additional variations and types of reaction chambers can be anticipated and included in light of this teaching, by those of ordinary skill in the arts of chemistry, chemical engineering, biology, and robotics.

The piping system 134 allows for the transport of gases, as well solids and liquids, to and from the reaction chambers, storage bins, and outside of the NF. Six pumps 136*a-f* are electronically controlled to independently suck in or blow out of each one of their ports to a connected pipe, as needed. Each port on each pump can also be closed and opened independently, allowing gases and other materials to be routed in one port and out another, or to be prevented from entering a port. The piping system 134 includes two horizontal pipes on each of the front and rear sides of the device along the storage bins 125, and three horizontal pipes on each of the front and rear sides of the device along the reaction chambers 130. Each of the horizontal pipes along the storage bins and reaction chambers is connected to a number of vertical pipes, one running along each storage bin and each reaction chamber. Each vertical pipe connects all of the horizontal pipes running along that storage bin or reaction chamber. Each of these connections has a box junction 135, which consists of an independent electronically controlled valve on each section of pipe leading away from the junction. This allows the pumps 136*a-f* to route air (or other material) flow along arbitrary paths in the piping system 134, by selectively opening and closing valves at various box junctions, and blowing from or sucking into selected connected pipes with the pumps 136*a-f*. Each box junction 135 also includes an electronically controlled valve connecting the junction directly to the storage bin or reaction chamber that its pipes run along. So, the upper rear pump 136*a* can suck hydrogen gas out of a storage bin and through rear pump 136*b*, then open the valves at a box junction 135 coming from pump 136*b* and leading into a reaction chamber 130 to combust, while simultaneously pumping nitrogen out of a second reaction chamber and into a third, using another port of pump 136*b* and by opening and closing the appropriate valves. The vast combinations of pumps, connecting pipes, box junctions, and valves allow for a flexible way to move multiple materials simultaneously. This piping system is so powerful that it is possible to conduct a wide variety of chemical reactions without utilizing the robotic arms at all. One alternative embodiment of the present invention does not have robotic arms or the carriage tracks they run on at all.

The upper rear pump 136*a* connects to the two horizontal pipes in the piping system 134 that run directly behind the rear storage bins. These pipes are also connected via electronically controlled valves to each other and the rear output pump 136*b*. This pump 136*b* also connects to an external pipe 137 and a pipe leading to the front output pump 136*e*, as well as to the three horizontal pipes that run directly behind the rear reaction chambers. These three pipes also connect to the lower rear pump 136*c*. Similarly, the upper front pump 136*d* connects to the two horizontal pipes in the piping system 134 that run directly in front of the front storage bins. These pipes are also connected via electronically controlled valves to each other and the front output pump 136*e*. This pump 136*e* also connects to an external pipe 138 and a pipe leading to the rear output pump 136*b*, as well as to the three horizontal pipes that run directly in front of the front reaction chambers. These three pipes also connect to the lower front pump 136*f*.

The preferred embodiment includes two 3-D plotting devices that are capable of precisely extruding arbitrary materials through a nozzle to create precise patterns and structures on one or more substrates. In the center of the NF, there are two carriage tracks 139*a-b* that each form the base of a 3-D plotting device, each driven by its own stepper motor 140*a-b* coupled to a central lead screw and two support rods surrounding the lead screw, which moves the carriage 141*a-b* on that carriage track. Each of the carriages 141 *a-b* has a similar secondary carriage track 142*a-b* mounted vertically on the primary carriage 141*a-b*, with a secondary motor 143*a-b* on each primary carriage 141 *a-b* driving the lead screw that positions a secondary carriage 144*a-b* on the secondary carriage track 142*a-b*. Each secondary carriage 144*a-b* has a nozzle 145*a-b* mounted on it, allowing the nozzle to be precisely positioned by the primary 140*a-b* and secondary 143*a-b* carriage motors along the vertical and one horizontal axis. The top of each nozzle is open, and can be positioned directly underneath the output port 132 of a reaction chamber, allowing that port to be opened and the contents to fall into the nozzle.

Each nozzle 145*a-b* can extrude the contents stored in it in a precise and controlled fashion through an electronically controlled valve in the precision tip 146*a-b*, allowing extremely intricate and detailed patterns to be created on the output tray 147 below. In the preferred embodiment, each nozzle tip 146*a-b* has an opening of 5 microns diameter, although can be electronically opened to as large as 200 mm diameter, the diameter of the nozzles 145*a-b*. Using standard 3-D printing techniques well known in the field of 3-D printing, many different materials can be layered to form 3-D objects, and different materials can be successively applied to substrates or partial objects on the output tray, enabling the production of an extremely wide range of physical objects. Adhesive bonding substances can easily be applied through the nozzles 145*a-b* to allow arbitrary structures to be built up, for example, using one or more drops of material at a time for each drop of adhesive applied to the current object on the output tray. The output tray 147 is itself mounted on yet another carriage track 148, with a central lead screw driven by a stepper motor 149 and supporting rods. The system provides yet another horizontal axis of control for the output tray, which in conjunction with the two axes provided by the primary 139*a-b* and secondary 142*a-b* carriage tracks of each 3-D plotting device, allows the nozzles 145*a-b* to output materials to virtually any point in 3-D space along the bottom of the NF. Sand casting and other techniques can be used to provide support structures for 3-D structures on top of them that can be easily removed later when an object has been completely created and any adhesives have fully bonded and set. Such structures can also be used as molds for casting other materials. In an alternative embodiment, one of the nozzles is replaced with a neodymium-doped yttrium aluminum garnet laser.

The output tray carriage track 148 extends through a hole in the bottom of the front enclosure panel 104 that leads to an easily-accessible chamber 150 at the front of the NF that the user can access by simply lifting the output chamber lid 151. This allows the user to retrieve any objects output by the NF, as well as to put substrates on the output tray that can then be processed and have materials extruded on them by the 3-D plotting devices. Of course, smaller materials, as well as liquids and gasses, can also be output from the NF through the output pipes 137, 138 as well.

The NF also includes a lift in the middle of the left side of the device. A lifting platform 152 with an open top and an electronically controlled side door can be propelled up and down a vertical carriage track 153 by another motor 154. The two-pronged grippers 111, 118 on the robotic arms can lift containers 121 from the lifting platform 152 as well as deposit containers or their contents onto the lifting platform. An additional carriage track 155 drives another carriage 156 with a motor 157, with paddles 158a-b on that carriage 156 that can be electronically rotated up and down by electric motors to move objects on the output tray 147. When the paddles 158a-b are rotated down into a horizontal position across the output tray 147, moving the carriage 156 along its track 155 can move objects on the output tray to and from the lifting platform 152, when its side door is open. These loading techniques, when combined with the lift, allow objects on the output tray to be transported back up to the reaction chambers 130, as well as objects in the upper part of the NF to be transported down to the output tray 147 for further processing, including larger objects that have been processed in a reaction chamber but cannot be safely extruded through a nozzle 145a-b. This ability to iteratively and successively process arbitrary materials in this fashion allows the NF to construct almost limitless types of objects. For example, a silicon wafer can be prepared in a reaction chamber 410 using chemical vapor deposition, then circuit patterns can be etched onto the wafer using masking agents extruded through the nozzles 145a-b, and then lifting the wafer back up to be exposed to ultraviolet radiation in a reaction chamber, bathing it in a non-destructive solvent to remove the masking agents, then growing an additional polysilicon layer on the wafer with chemical vapor deposition, and repeating and adding further steps as necessary, including additional silicon dioxide and aluminum layers, until a finished CMOS product has been produced. Since the NF has two independent 3-D plotting devices, both nozzles 145a-b can easily be outputting different substances simultaneously to the same or different objects, for example, simultaneously applying two different substances that combine to cause a chemical reaction on the substrate, such as epoxy.

The NF also includes a sealed waste shaft 159 that can be used to get rid of unwanted materials and by-products. One or both of the output pipes 137-138 can also be used for this purpose from time to time, but may not work as well with larger solid objects that cannot fit through the pipes. The output pumps 136b, 136e also have an additional port that can open directly into the waste shaft 159, so that unwanted materials can be pumped into it. The robotic arms will dump unneeded or unwanted materials into the waste shaft 159 through one of the electronically controlled doors 160a-d (and four additional doors on the opposite side, not visible in FIG. 1, but directly opposite these doors) which are opened for this purpose, and then closed afterwards. The paddles 158a-b on the paddle carriage 156 can also be used to sweep unwanted objects off the output tray 147 through the electronically controlled door 160e into the waste shaft 159. Materials put into the waste shaft will fall to the bottom, where they can be manually removed by the user manually opening the waste door 161, as well as automatically pumped out by the output pumps 136b, 136e, when the waste door is electronically opened by the NF control system.

In an alternative embodiment, the robotic arms and containers are replaced with a rotating suction device that can suck solids, liquids, and gases into a syringe, and squirt them out into the desired storage bins or reaction chambers. In another alternative embodiment, additional degrees of freedom are added to the robotic arms and carriage tracks by adding additional linear or rotational actuators, to allow for a broader range of movement.

All of the electrical devices in the NF are controlled by means of a control box 162 that generates the appropriate electrical signals to drive all of the motors, actuators, and other devices, and receives information from all of the sensors in the NF, using standard electrical signals well known to those of ordinary skill in the art of electronics and motor control. In the preferred embodiment, these signals are generated and received by a computer connected to the NF via a wired or wireless connection, and processed and controlled by software on that computer. The user can also manually specify each command in real time, if desired. In an alternative embodiment, the control box also contains a microcontroller that performs these functions instead, eliminating the need for any hardware outside of the NF. In the preferred embodiment, the control box also contains a power port to provide external power to the NF, as well as an AC adapter to allow both AC and DC power to be utilized as needed inside the NF. In an alternative embodiment, the control box also contains a battery to allow the NF to operate without external power. In another alternative embodiment, power can also be generated internally, automatically as needed, using the input materials in the storage bins, and performing the appropriate exothermic reactions on them, and capturing that energy from the reaction chambers. For example, acid and a zinc electrode attached to electrical leads in a reaction chamber, or a thermal temperature difference across Peltier devices, can be used to generate electricity for the NF.

Figure 4:
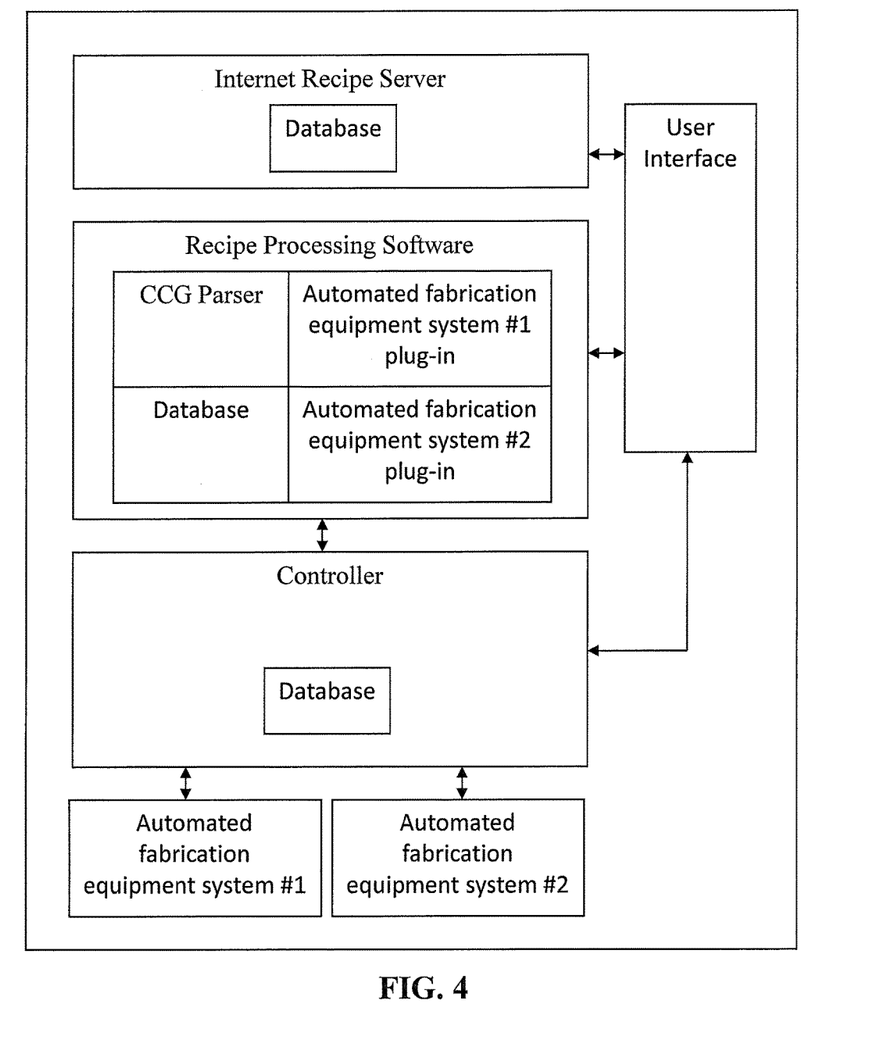
FIG. 4 is a system-level diagram of the software components of the preferred embodiment and the interactions between those components.

The preferred embodiment of the present invention further comprises a Recipe Processing Software process capable of converting chemical, electrical, and mechanical "recipes" into machine-specific instructions for automated fabrication equipment such as the Nanofabricator, a Controller for executing those instructions on and interpreting feedback from the automated fabrication equipment, a user interface, and an Internet Recipe Server for accessing, sharing, editing, and selling recipes, as shown in FIG. 4. The user interacts with the system through the user interface to schedule, execute, find, and otherwise transact with recipes. The user interface exchanges data with the Internet Recipe Server to search for, purchase, upload, and download recipes. The Internet Recipe Server uses a database to store and lookup recipes. The user interface invokes the Recipe Processing Software to read a recipe and determine the automated fabrication equipment to use and to generate the appropriate machine-specific instructions for each such piece of identified equipment. The user interface uses this information to invoke the Controller, which sends the generated machine-specific instructions to the appropriate pieces of automated fabrication equipment at the appropriate times and monitors feedback from such equipment. The Recipe Processing Software and Controller are described in more detail later below.

Figure 5:
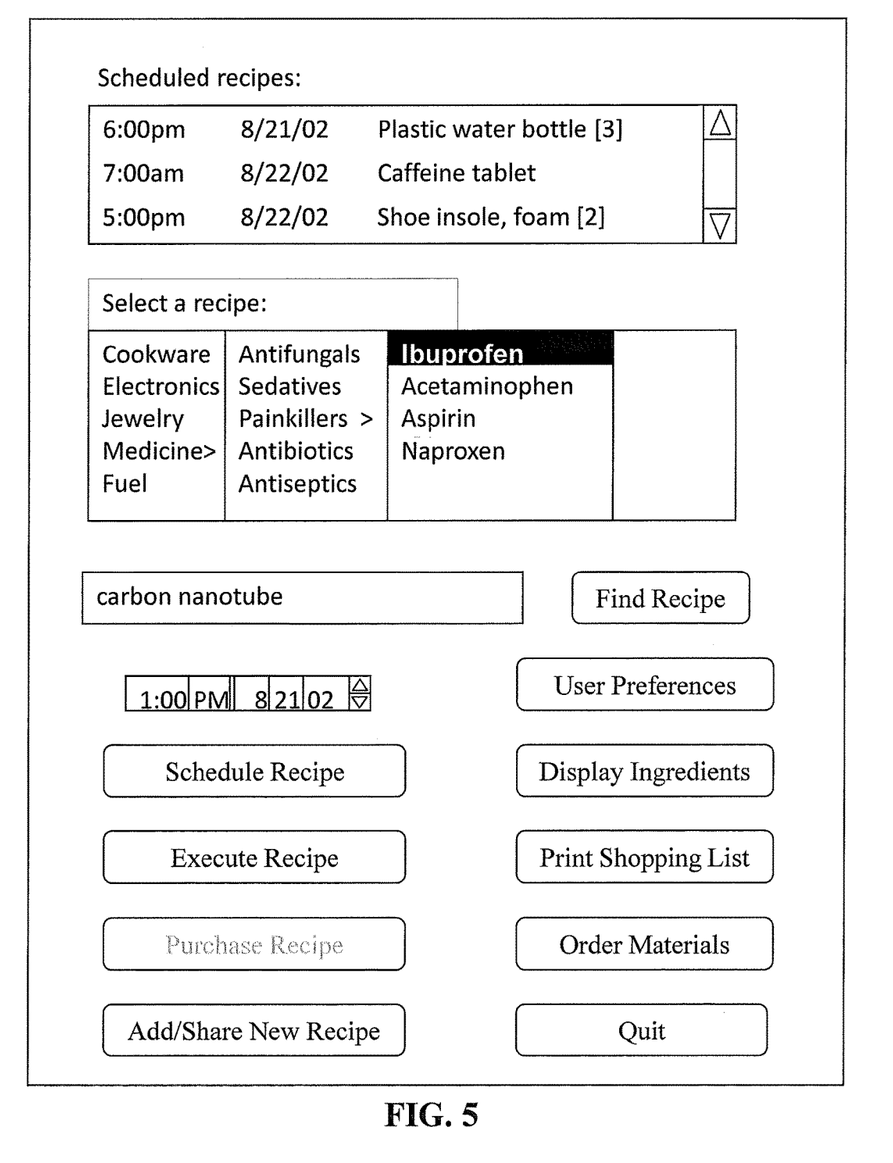
FIG. 5 is a simplified drawing of the user interface for scheduling and executing software "recipes" in the preferred embodiment on the Nanofabricator device or other automated fabrication equipment.

A user can request a specific recipe to be prepared either through a local user interface or remotely over the Internet through an identical user interface on the World Wide Web, as shown in FIG. 5. In both cases, the user interface will allow the user to customize or modify the recipe, schedule the preparation of the recipe for some point in the future, add and share new recipes over the Internet, and purchase additional recipes over the Internet. When scheduling a recipe for the future, the user may either specify the desired time the recipe should be ready by (in which case the system will automatically schedule the recipe to start before the desired ready time, by estimating the amount of time necessary to perform the recipe, using the parser described below and a database of estimated times of each fabrication operation) or the time at which recipe preparation should begin. In the preferred embodiment, all recipes are specified in natural language, although alternative embodiments can employ more compact machine-independent recipe representations. In one such alternative embodiment, recipes are instead specified in the Object Fabrication Interchange Format (OFIF) to make parsing recipes easier and simpler. An OFIF file consists of a series of lines of text, where each line starts with one of the following commands, or other supported operation command names: mix, microwave, ultrasound, boil, distill, titrate, drip, spin, rotate, sift, CVD (for chemical vapor deposition), electrify, stir, heat, put, cool, extrude, or assign. Each command is followed by an optional time parameter and optional speed, temperature, pressure, voltage, current, and frequency parameters for each command, followed by variables to apply the command to. These variables are used to represent physical objects and materials, containers 121, storage bins 125, reaction chambers 130, pipe sections in the piping system 134, the lifting platform 152, and other locations in the fabrication device, and all initial ingredients are assigned to variables at the top of the file using the assign command. The assign command is a special case, which takes either one or two arguments: the first argument is the variable to assign an object or volume of gas or other matter to, and the optional second argument is the ingredient, object, or container to assign to that variable. If a second argument is not provided, the result of the last operation is instead assigned to that variable. For example, the commands, "mix V1 V2" and "assign V3" will mix together the ingredients assigned to the variables V1 and V2 and assign the mixture to the variable V3. The commands "open", "close", "pump in", and "pump out" can also be used to control individual valves, lids, and openings in the NF and its piping system 134. In this case, the arguments specify the location to apply the command to, and an optional speed parameter. The preferred embodiment is also capable of generating a recipe in the OFIF format from natural language "recipes", using the same parser described below for initial processing. The recipe also contains an auxiliary file containing any necessary CAD/CAM information for creating physical objects using the 3-D plotting devices with various materials during the fabrication process. The recipe file references this CAD/CAM information using the "extrude" command, and a reference to the identifier of the CAD/CAM information. The Recipe Processing Software then generates the appropriate instructions to control the 3-D plotting using standard CAM (Computer-Aided Manufacturing) techniques used by CNC machines, and passes them to the Controller to send to the fabrication devices at the proper times.

In an alternative embodiment, a remote telephony interface is also supported, allowing users to type in the first few letters of a desired object or verbally state the name of the recipe via a speech-recognition interface. The interface will then verify the correct recipe by using a text-to-speech system to read the user a short description of the recipe followed by the full listing of the recipe. The user may confirm this recipe or search for alternative or similar recipes via a touchtone or voice command at any time during this process.

Once the user has executed or scheduled a recipe for preparation, the preferred embodiment of the present invention will display the necessary ingredients required for that recipe, as well as the current stores of ingredients contained in any connected fabrication devices, such as the storage bins 125 of the NF. The user interface will invoke the controller to query connected fabrication devices for current inventories of ingredients, and will also maintain an independent record of quantities of ingredients ordered and quantities of ingredients used, to handle cases where such queries are not supported by the connected fabrication equipment. The user can also configure the system to automatically order any ingredients needed for all scheduled recipes over a specific time frame for delivery, by using the Internet, and can also automatically print a shopping list of all needed ingredients. When loading the storage bins 125 of the NF, the user must manually specify to the software what material is being loaded in each bin, although the bins are capable of automatically measuring the mass and volume of that material. In an alternative embodiment, the NF will actually use the reaction chambers 130 and their sensors to chemically, visually, or electromagnetically determine the chemical composition of the materials inserted into the storage bins 125.

In addition, the system can be configured to predict the ingredients needed over a specified time frame even before some or any of the recipes scheduled for that time frame are entered into the system. This is accomplished by accumulating historical data of the user's recipe selection and using statistical analysis to extrapolate likely needed ingredients in the near future. In the preferred embodiment of the present invention, time-sensitive linear regression of all previously used ingredients over the past year is conducted, with weights of less recently used ingredients discounted by the square of the number of weeks since last usage. Ingredients for which the system predicts quantities needed below a user-specified tolerance level are ignored.

The system can also modify recipes automatically to accommodate specific user preferences. For example, if the user is trying to reduce toxic byproducts of chemical reactions, the user can configure the system to automatically substitute propylene glycol for ethylene glycol when making products like antifreeze, to reduce toxic byproducts. If the user wants to only use "green", renewable ingredients and reactions, they can also generate the propylene glycol from waste glycerin, one of the byproducts of biodiesel production, which the system can automatically save for this purpose when producing biodiesel fuel, or the user can load manually from external sources. The system will automatically accomplish these preferences and substitutions by using a remote database on the Internet Recipe Server that maps such ingredients to their substitutes, also adjusting the quantities if indicated by the database. The database can contain specific conditions for substitutions as well, for example making substitutions only if a material is non-acidic, or in all recipes except those for producing water-proof objects.

The database can also track rankings of various chemical reactions and "recipes" to automatically present the most popular ones to the user first. In addition, the user can set up the Recipe Processing Software to automatically try several variations of a given recipe, with variable parameters, and then automatically score the results based on some automatic reading of the sensor in the NF or other automated fabrication device. This system can then take the best scoring results, and then randomly modify any remaining variable parameters and iteratively repeat the process, until it identifies the optimal settings for each variable parameter. This allows the Recipe Processing Software to essentially use a genetic algorithm or other statistical technique to automatically figure out how to best produce materials and objects with user-specified characteristics.

The Recipe Processing Software that converts natural language recipes to fabrication machine instructions begins by using a combinatorial categorical grammar parser to extract syntactic and semantic data from the natural language sentences in a recipe's text. The grammar used in the preferred embodiment is a standard English grammar augmented with constructs for parsing ingredient lists to extract the ingredients and quantities needed for a given recipe. The augmented constructs simply parse stand-alone noun phrase sentence fragments that are not part of any other sentence and begin with a quantity specifier (i.e. 6 ml of glycerol). When an ingredient has a recipe for making that ingredient available either locally or on the Internet Recipe Server, at the user's option, the system will automatically parse and execute the recipe for making that ingredient before starting on the originally requested recipe. If this option is chosen by the user, the above-mentioned scheduling system and ingredient prediction system will also include these dependencies when calculating time or ingredients needed for any requested recipe. This allows dependent recipes to be automatically made when desired (for example, if the user desires ethanol from corn to be used as an ingredient in a recipe, the system can automatically make the ethanol first, instead of requiring the user to insert a comparable fossil fuel) and premade ingredients to be used otherwise (for example, if the user just wants to make a recipe as quickly as possible using store-bought ingredients). This also allows a user to make almost any common material desired using ordinary, inexpensive household compounds available from a grocery store, such as vinegar, cooking oil, salt, hydrogen peroxide, alcohol, or water, by extracting the desired base compounds and combining them to make other molecules. For example, hydrogen and oxygen gas can be easily made by performing electrolysis on water with a salt as a catalyst. While this may not be as energy-efficient or fast in some cases as high-yield modern industrial chemical processes, it allows many compounds to be made in small, individualized quantities, without the aid of expensive or hard to obtain ingredients, or specialized processing facilities. Alternative embodiments use grammars for other languages as well as grammars with other formalisms, such as tree adjoining grammars and head-driven phrase structure grammars.

When reading in units during parsing, all volumes are converted to milliliters and all masses are converted to grams internally, using a 64-bit floating-point representation. This allows the system to read in all common units of measurement, using both the British imperial system and metric, as well as any other measurement system added to the grammar. In cases where a unit name is ambiguous with regard to measurement system, the default measurement system for the current locality of the underlying operating system will be used unless otherwise specified by the user.

When parsing a sentence that is not an ingredient listing, the parser will identify known fabrication commands (such as mix, combine, heat, etc.) in the sentence and the roles of any arguments in that sentence using standard grammatical parsing techniques well known in the art of natural language processing (in the preferred embodiment, the CCG parser). Sentences with unknown commands are logged and ignored during execution, while unrecognized adjectives, adverbs, clauses, prepositional phrases, and other syntactic types are ignored and logged without affecting other processing of the sentences containing them. However, if a noun phrase that is not part of a parent prepositional phrase cannot be recognized by the parser, an error message is shown to the user and the user is asked to select whether to ignore the command, ignore just the noun phrase, or to abort operation completely. This behavior can be overridden by setting a user preference to default to one of these actions without alerting the user.

Each fabrication command has an entry in a local database containing rules for the semantic roles involved in conducting each command. The entry for the command "mix" contains a rule indicating that noun phrase objects of the sentence should be mixed together by a piece of fabrication equipment supporting the "mix" operation. It also contains rules indicating that prepositional phrases in the sentence with the command are used to place conditions on how the mixing must occur. Prepositional phrases of the form, "with X" will use X to perform the mixing operation when X is a stirring device, tool, or other piece of equipment. When X is a chemical ingredient or product of previous operations, X will instead be mixed together with the other noun phrase object or objects of the sentence. The entry also contains a rule for handling adverbs in a sentence that apply to the command "mix", which adds parameters to the mixing process. The adverbs "slowly" and "quickly" cause the system to add a corresponding speed parameter to the appropriate mix command when executed on the automated fabrication equipment. Of course, these parameters can be specified precisely by directly using numerical values as well. The database entry for the command "combine" simply indicates to use the rules for the command "mix". The entry for the command "heat" contains a rule indicating that the noun phrase objects of the sentence should be heated to the temperature specified by a prepositional phrase in the sentence that contains a temperature, or to a default temperature if no temperature is specified in the sentence. The entry for the command "boil" operates in a similar manner, except that the noun phrase objects of the sentence are heated until a fabrication equipment sensor indicates a condition of "boiling", which in the preferred embodiment occurs when a heat sensor detects that a material has reached its boiling temperature, as noted in the database. Many other useful commands are also easily apparent to one of ordinary skill in the art, in light of the above teaching, and are implemented using the same basic techniques taught above.

In the preferred embodiment, after a recipe is completely parsed, the software will then identify the appropriate automated fabrication equipment available for handling each specified operation in the recipe. Some operations may require simultaneous execution on more than one piece of equipment. For each operation, the software will generate one or more machine-specific control instructions for the selected automated fabrication equipment. When multiple pieces of automated fabrication equipment are capable of handling the same operation, the preferred embodiment of the present invention will pick the equipment that requires the least time to complete the desired operation, including any delays needed to wait for previous operations to complete and to transfer any necessary materials to that piece of equipment. This ensures that the system takes full advantage of unutilized equipment to reduce wait times. If multiple pieces of equipment will complete the desired operation in the same amount of time, the piece of equipment most recently used will be selected. In an alternative embodiment, the system will instead optimize for minimal equipment usage instead of time. In another alternative embodiment, the system will use linear optimization to schedule operations by solving the linear system simultaneously to reduce wait times. In the preferred embodiment, the NF communicates to the software a list of its operations described in this document for each of the reaction chamber interiors 401-410 described, as well as for the other components of the NF such as the 3-D plotting devices, lifting platform 152, piping system 134, pumps 136a-f, and robotic arms.

The software will call the Controller to query each connected piece of equipment to determine what operations it supports, when that piece is initially connected to the system. In the event that a piece of automated fabrication equipment does not support this sort of query, the software will instead consult a database to determine this information.

In an alternative embodiment, appropriate equipment is identified and machine instructions are generated during parsing, allowing streaming of long recipes to occur so that the system does not have to complete downloading and parsing an entire recipe before beginning to execute it on the automated fabrication equipment.

The preferred embodiment also allows a user to directly specify commands interactively, in real-time, to the automated fabrication equipment, either in a high-level format as described above in natural language or OFIF through the Recipe Processing Software or in low-level machine-dependent commands or electrical signals directly through the Controller.

In an alternative embodiment, the Recipe Processing Software contains a Digital Rights Management (DRM) system to prevent unauthorized or unlicensed processes to be used on the automated fabrication equipment. Each recipe must be cryptographically signed by a trusted private key, and the Recipe Processing Software will verify the signature before executing its instructions. In another alternative embodiment, the NF contains a Digital Rights Management system as well, preventing specific NF operations from occurring without authorized cryptographic signatures embedded in the instructions, encrypted with this specific NF's public key by a remote Recipe Processing Software process on a secured central server. In addition to preventing unlicensed use of recipes, this DRM system can be used to prevent users from conducting dangerous operations that could create toxic, explosive, or otherwise dangerous materials. In yet another alternative embodiment, the NF control system automatically scans all instructions for anything that could cause damage to the machine or its user, or create harmful chemical reactions, independent of any DRM technology. This is as simple as making sure that reaction chambers do not exceed their specified temperature and pressure thresholds, monitoring for known chemical reactions with harmful results or by-products, and other safety monitoring as desired. In another alternative embodiment, this monitoring is also done on recipes by the Recipe Processing Software.

In the course of generating instructions to carry out various operations, ingredients and processed items will often need to be moved either within a piece of equipment or from one piece of equipment to another, for example, to move an item that has been mixed in one reaction chamber to be heated in another reaction chamber. The software will identify when this needs to occur based on a pre-existing database with physical location data for each utilized piece of equipment. This database includes the location and dimensions of each compartment where a fabrication operation can take place, as well as any commands needed to open, close, load, or remove an item from that compartment. In the preferred embodiment, this includes the storage bins 125, reaction chambers 130, grippers of the robotic arms 111, 118, output tray 147, nozzles 145a-b, lifting platform 152, and waste shaft 159 of the NF. The software will keep track of the current location of every movable item and piece of equipment in the system and generate machine-specific control instructions for each time an item or piece of equipment needs to be moved. For some machines, this will simply be multidimensional coordinate positional data, but for others it requires generating instructions that create specific electromagnetic pulse signals for stepper motors or servos. The software will determine that an item needs to be moved if it is currently (at that point in the instruction sequence) not in the appropriate compartment of the fabrication equipment selected for performing the desired fabrication operation. In the case where a piece of movable fabrication equipment was selected to perform the desired operation, the software will instead direct the fabrication equipment to move to the current location of the item to be processed, or to an intermediate location suitable for performing the operation (where the object or element or compound is also moved, if necessary), if such a location is specified in the database.

To generate an instruction for a specific piece of automated fabrication equipment, the software will call a plug-in module written for that piece of equipment to determine what machine-specific instructions to generate for a given desired operation. Support for new automated fabrication equipment can be added by writing new plug-ins to this software. In the preferred embodiment of the present invention, each plug-in module looks up the entry for the desired operation in a built-in database to determine the corresponding machine-specific instructions to generate. Each database entry contains the format and parameter structure for a given fabrication operation (such as mix, heat, etc.) and rules for mapping the semantic machine-independent arguments and temperature and speed and other settings to that parameter structure. In an alternative embodiment, this database lookup is bypassed when plug-ins instead have a specific function defined to perform a given processing operation, allowing heuristics to be used instead of database lookups when desired.

For example, suppose the software needs to prepare material for an object in response to the parsed sentence, "Heat at 400° C. for 15 minutes or until evaporated." The parser identifies the word "heat" as a command for heating in an enclosed environment and determines that reaction chamber 409 in the NF is the first piece of equipment available to carry out this command. The parser also identifies the prepositional phrases to indicate the temperature to heat to and remain at and the condition to stop heating (which in this case is a conjunction of two prepositional phrases: after 15 minutes or when the reaction chamber 409 sensors detect that any liquid has fully evaporated, by measuring its mass in the spinner 437, minus the known mass of any container placed therein). Conjunctions such as "and" and "or" are handled using standard Boolean logic. The software will call its automated reaction chamber plug-in, which will generate a series of machine-dependent instructions to load an item into the reaction chamber and to raise the temperature to 400°. The software will also generate instructions to cause the NF to provide feedback data of the current condition of the item from the reaction chamber sensors, so that the Controller will know when to proceed to the next machine-dependent instruction, which tells the NF to turn off the heating element 436 in the reaction chamber 409 and unload the item. The Controller will wait until either 15 minutes have passed or until the reaction chamber sensors detect that any liquids are fully evaporated before executing these instructions. "Evaporated" is a specific condition stored in a database in an entry indicating the sensor output ranges that correspond to this condition, namely, a mass (minus the known mass of any empty containers in the reaction chamber) of zero.

In the preferred embodiment of the present invention, supported conditions include "brown", "soft", "hard", "solid", "transparent", "evaporated", "sublimated", "supersaturated", "saturated", "dry", "vaporized", "white", "red", "blue", "green", "black", "warm", "hot", "cold", "frozen", "boiling", "melted", and "dissolved" although many more are possible and easily envisioned by one skilled in the art in light of the above teachings. Temperatures in both Celsius and Fahrenheit are supported and times may be specified in seconds, minutes, or hours and fractions thereof.

The software will also generate machine-dependent instructions for each piece of equipment, in order to clean that equipment after all other instructions for that equipment have been completed, if the equipment supports self-cleaning instructions. In the case of the NF in the preferred embodiment, the ultrasonic and other cleaning abilities described in this disclosure are used for this purpose.

In an alternative embodiment of the present invention, instead of generating machine-dependent control instructions directly, the software will generate machine-independent intermediate instructions, such as those for the OFIF format described previously. These can be post-processed by users, other pieces of software, or automated fabrication equipment that can handle such an intermediate format.

In the preferred embodiment of the present invention, the Controller for executing recipes on the automated fabrication devices and for interacting with those systems is a software program running on a computer system that can interface with all available automated fabrication devices. The interface between the Controller and each system can be an Ethernet connection, USB connection, Wi-Fi connection, Bluetooth connection, or any other peripheral interface supported by the underlying hardware. The interface can also utilize high-level protocols such as TCP/IP when low-level transport details are handled by the underlying operating system or hardware.

When preparing a recipe, the Controller sends the generated instructions over the appropriate interface to the specified automated fabrication equipment. Some automated fabrication equipment requires sending one instruction at a time, while other pieces of equipment can handle blocks of instructions at once. For some equipment, such as the NF in the preferred embodiment, these "instructions" are simple electromagnetic pulses directly used to control individual motors or servos in the equipment, while for others they are microcontroller instructions or other higher-level machine control instructions. The Controller determines these capabilities from a database, or from querying equipment that supports such queries. The Controller is also capable of sending instructions to multiple pieces of equipment at once, when the software has determined either that simultaneous execution is necessary or that the instructions are independent. The Controller also prompts the user when processing any instructions that require human assistance—for example, asking someone to insert a specific ingredient into a storage bin or the output tray.

The Controller also monitors feedback from all of the connected automated fabrication equipment to ensure that all systems are behaving as expected. If any feedback parameters exceed pre-specified tolerance levels, for example a temperature sensor indicates an item is at 150° C. when it is only supposed to be at 100° C., the system will halt and alert the user. In an alternative embodiment, the system will instead attempt to correct the problem and continue (but will still alert the user). In the above example, this alternative embodiment of the system would send machine-dependent commands to the affected equipment to lower the temperature or turn off the equipment, instead of halting the entire instruction sequence.

The foregoing description of the preferred embodiment and select alternative embodiments of the invention has been presented for the purposes of illustration and description. It is not intended to be exhaustive or to limit the invention to the precise forms disclosed. Many modifications and variations are possible in light of the above teaching.

The invention claimed is:

1. An automated fabrication system for making on-demand physical objects, comprising:
   a processor in communication with one or more automated fabrication equipment, the processor executing a program stored on a non-transient computer readable memory, the program for parsing machine-independent instructions specified in natural language, wherein the machine-independent instructions specified in natural language construct a desired object;
   the program for parsing machine-independent instructions comprising the steps of:
      receiving machine-independent instructions specified in natural language,
      extracting syntactic data and semantic data from the machine-independent instructions specified in natural language,
      using the syntactic data and the semantic data to convert the machine-independent instructions specified in natural language into one or more machine-dependent instructions specified in program command sequences, wherein the program command sequences instruct the operation of the one or more automated fabrication equipment;
   the processor transmits the program command sequences to the one or more automated fabrication equipment, wherein the one or more automated fabrication equipment each include a controller that executes the program command sequences to fabricate the desired object;
   the one or more automated fabrication equipment comprising one or more input containers, one or more reaction chambers, and a robotic arm or pump;
   the one or more input containers each contain matter used to construct the desired object;

the one or more reaction chambers each conduct a chemical, electrical, or mechanical reaction on the matter to process the matter;

the robotic arm or pump moves the matter between the one or more input containers and the one or more reaction chambers; and the robotic arm or pump moves the processed matter between the one or more reaction chambers and one or more output devices to output the desired object.

2. The automated fabrication system of claim 1, wherein the one or more output devices is a CNC 3-D plotting device extruding the processed matter.

3. The automated fabrication system of claim 1, wherein the robotic arm or pump moves the processed matter from one reaction chamber to another reaction chamber.

4. The automated fabrication system of claim 1, further comprising two or more reaction chambers that collectively apply heat, pressure, and mixing to produce the processed matter.

5. The automated fabrication system of claim 1, wherein the one or more reaction chambers apply EMF radiation to the matter.

6. The automated fabrication system of claim 1, wherein the one or more reaction chambers monitor and react to the results of chemical reactions on the matter.

7. The automated fabrication system of claim 1, wherein the processor selectively prevents the execution of one or more unauthorized or unlicensed processes on the one or more automated fabrication equipment.

8. The automated fabrication system of claim 1, wherein the processor predicts the matter needed for objects not yet requested in the system.

9. The automated fabrication system of claim 1, wherein the system automatically makes the matter needed to fabricate the desired object.

10. The automated fabrication system of claim 1, wherein the program command sequences of the one or more machine-dependent instructions are generated and transmitted according to an optimization criteria.

\* \* \* \* \*